(12) United States Patent
Nagakura et al.

(10) Patent No.: US 11,148,011 B2
(45) Date of Patent: Oct. 19, 2021

(54) GOLF BALL

(71) Applicant: Sumitomo Rubber Industries, Ltd., Kobe (JP)

(72) Inventors: Hikaru Nagakura, Kobe (JP); Kazuyoshi Shiga, Kobe (JP); Ryota Sakamine, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/233,790

(22) Filed: Dec. 27, 2018

(65) Prior Publication Data

US 2019/0201747 A1 Jul. 4, 2019

(30) Foreign Application Priority Data

Dec. 28, 2017 (JP) .............................. JP2017-252824
Dec. 28, 2017 (JP) .............................. JP2017-252825

(51) Int. Cl.

| A63B 37/04 | (2006.01) |
| C08L 9/00 | (2006.01) |
| A63B 37/00 | (2006.01) |
| C08K 5/56 | (2006.01) |
| C08K 3/22 | (2006.01) |
| C08K 3/30 | (2006.01) |
| C08K 5/098 | (2006.01) |
| C08K 5/14 | (2006.01) |
| A63B 45/00 | (2006.01) |

(52) U.S. Cl.
CPC ...... *A63B 37/0051* (2013.01); *A63B 37/0062* (2013.01); *A63B 37/0063* (2013.01); *C08K 3/22* (2013.01); *C08K 3/30* (2013.01); *C08K 5/098* (2013.01); *C08K 5/14* (2013.01); *C08K 5/56* (2013.01); *A63B 37/0061* (2013.01); *A63B 37/0064* (2013.01); *A63B 37/0065* (2013.01); *A63B 37/0074* (2013.01); *A63B 37/0075* (2013.01); *A63B 37/0076* (2013.01); *A63B 37/0087* (2013.01); *A63B 45/00* (2013.01); *C08K 2003/2296* (2013.01); *C08K 2003/3045* (2013.01)

(58) Field of Classification Search
None
See application file for complete search history.

(56) References Cited

U.S. PATENT DOCUMENTS

| 4,483,537 | A | 11/1984 | Hanada et al. | |
| 4,546,980 | A * | 10/1985 | Gendreau | A63B 37/0003 473/372 |
| 4,955,613 | A * | 9/1990 | Gendreau | A63B 37/0003 260/998.14 |
| 5,501,643 | A * | 3/1996 | Isshiki | F16G 1/08 474/268 |
| 6,193,920 | B1 * | 2/2001 | Moriyama | B29C 39/10 264/250 |
| 6,281,294 | B1 * | 8/2001 | Tanaka | A63B 37/0003 473/371 |
| 6,413,464 | B1 * | 7/2002 | Tanaka | A63B 45/00 264/328.2 |
| 2003/0144086 | A1 * | 7/2003 | Dalton | B29C 43/146 473/371 |
| 2006/0135287 | A1 * | 6/2006 | Kennedy | A63B 37/0003 473/371 |
| 2008/0194357 | A1 * | 8/2008 | Higuchi | A63B 37/0051 473/373 |
| 2009/0227395 | A1 * | 9/2009 | Sullivan | A63B 37/0062 473/377 |
| 2019/0202095 | A1 * | 7/2019 | Sakamine | C08K 3/30 |

FOREIGN PATENT DOCUMENTS

| JP | 57-25337 | A | | 2/1982 |
| JP | 58-118775 | A | | 7/1983 |
| JP | 2012-139414 | A | | 7/2012 |
| JP | 2012139414 | | * | 7/2012 |

OTHER PUBLICATIONS

Akrochem Peroxide Comparison (no date). (Year: 0000).*

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having excellent impact durability. The present invention provides a golf ball comprising a spherical core and at least one cover layer covering the spherical core, wherein the spherical core is formed from a core rubber composition containing (a) a base rubber, (b) an α,β-unsaturated carboxylic acid having 3 to 8 carbon atoms and/or a metal salt thereof as a co-crosslinking agent, (c) a crosslinkable compound having two or more polymerizable unsaturated bonds in the molecule, and (d) a crosslinking initiator.

23 Claims, 1 Drawing Sheet

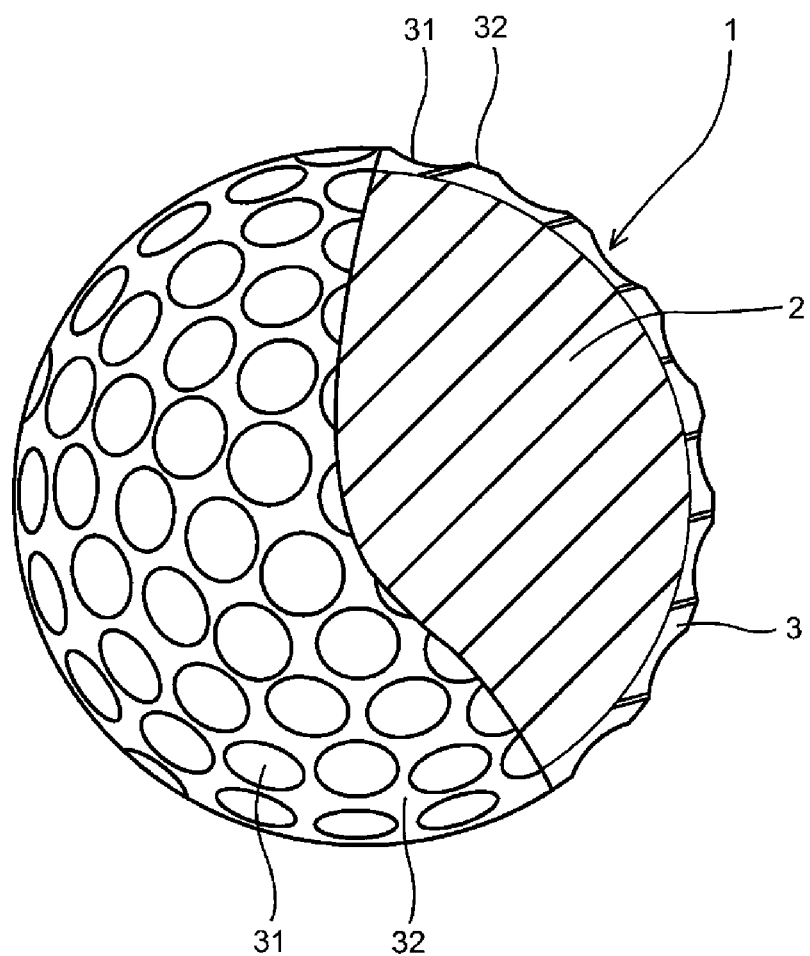

GOLF BALL

FIELD OF THE INVENTION

The present invention relates to a golf ball.

DESCRIPTION OF THE RELATED ART

Conventionally, a golf ball comprising a spherical core formed from a rubber composition and a cover covering the spherical core has been proposed. The golf ball is usually used repeatedly. Thus, the golf ball is desired to have impact durability. As a method for improving the impact durability of the golf ball, a method of adding a polyfunctional compound in the rubber composition constituting the core has been proposed.

For example, Japanese Patent Publication No. S57-25337 A discloses a golf ball formulation containing a polybutadiene as a base material, wherein a mixture of a polyfunctional unsaturated ester and an unsaturated carboxylic acid is added in the polybutadiene as a polymerization crosslinkable monomer in an amount of 20 to 35 parts by weight with respect to 100 parts by weight of the polybutadiene.

In addition, Japanese Patent Publication No. S58-118775 A discloses a golf ball obtained by heat crosslinking a composition containing 100 parts by weight of a polybutadiene rubber, 15 to 25 parts by weight of acrylic acid or methacrylic acid, 1 to 15 parts by weight of an ester of acrylic acid or methacrylic acid, 20 to 70 parts by weight of zinc oxide, and 1 to 6 parts by weight of an organic peroxide to form a solid core having a diameter of from 36.5 mm to 39.0 mm, and covering a composition containing 100 parts by weight of an ionomer resin, 0.5 to 10 parts by weight of a metal salt of acrylic acid or methacrylic acid, and 1 to 5 weight by parts of a coloring agent in a thickness of from 1.8 mm to 2.3 mm on the solid core.

In addition, Japanese Patent Publication No. 2012-139414 A discloses a golf ball comprising a spherical body as a golf ball constituent element, wherein the spherical body is formed from a rubber composition containing (a) a base rubber, (b) a co-crosslinking agent, (c) a crosslinking initiator, and (d) a microcapsule encapsulating a curing agent, and the spherical body has a hardness difference between a surface hardness and a center hardness of 26 or more in JIS-C hardness, and a hardness difference between the surface hardness and a hardness at a point having a distance of 10 mm from the surface thereof of 15 or more in JIS-C hardness.

SUMMARY OF THE INVENTION

An object of the present invention is to provide a golf ball having excellent impact durability.

The present invention that has solved the above problems provides a golf ball comprising a spherical core and at least one cover layer covering the spherical core, wherein the spherical core is formed from a core rubber composition containing (a) a base rubber, (b) an $\alpha,\beta$-unsaturated carboxylic acid having 3 to 8 carbon atoms and/or a metal salt thereof as a co-crosslinking agent, (c) a crosslinkable compound having two or more polymerizable unsaturated bonds in the molecule, and (d) a crosslinking initiator.

In the first preferable embodiment of the present invention, the golf ball comprises a spherical core and at least one cover layer covering the spherical core, wherein the spherical core is formed from a core rubber composition containing (a) a base rubber, (b) an $\alpha,\beta$-unsaturated carboxylic acid having 3 to 8 carbon atoms and/or a metal salt thereof as a co-crosslinking agent, (c) a crosslinkable compound having two or more polymerizable unsaturated bonds in the molecule, (d) a crosslinking initiator, and (e) a metal compound, where a molar ratio (divalent metal ion/component (b1)) of a divalent metal ion included in (b) the co-crosslinking agent and (e) the metal compound to (b1) an $\alpha,\beta$-unsaturated carboxylic acid component having 3 to 8 carbon atoms in (b) the co-crosslinking agent ranges from 0.60 to 2.00. In the first preferable embodiment, the impact durability is improved while maintaining the resilience by controlling the molar ratio (divalent metal ion/component (b1)) in the rubber composition constituting the spherical core.

In the second preferable embodiment of the present invention, the golf ball comprises a spherical core and at least one cover layer covering the spherical core, wherein the spherical core is formed from a core rubber composition containing (a) a base rubber, (b) an $\alpha,\beta$-unsaturated carboxylic acid having 3 to 8 carbon atoms and/or a metal salt thereof as a co-crosslinking agent, (c) a crosslinkable compound having two or more polymerizable unsaturated bonds in the molecule, (d) a crosslinking initiator, and (f) an organic sulfur compound, wherein (f) the organic sulfur compound is at least one member selected from the group consisting of thiophenols substituted with a halogen, a metal salt of thiophenols substituted with a halogen and diphenyl disulfides substituted with a halogen, and a mass ratio (component (c)/component (f)) of the component (c) to the component (f) ranges from 4 to 30. In the second preferable embodiment, the obtained golf ball has excellent resilience performance and impact durability by adding (c) the crosslinkable compound and (f) the organic sulfur compound in the core rubber composition. Further, the resilience performance and impact durability of the golf ball are improved without sacrificing the shot feeling of the golf ball by using the component (c) and the component (f).

According to the present invention, a golf ball having excellent impact durability is obtained.

BRIEF DESCRIPTION OF THE DRAWINGS

The FIGURE is a partially cutaway cross-sectional view showing a golf ball of one embodiment of the present invention.

DESCRIPTION OF THE PREFERRED EMBODIMENT

The present invention provides a golf ball comprising a spherical core and at least one cover layer covering the spherical core, wherein the spherical core is formed from a core rubber composition containing (a) a base rubber, (b) an $\alpha,\beta$-unsaturated carboxylic acid having 3 to 8 carbon atoms and/or a metal salt thereof as a co-crosslinking agent, (c) a crosslinkable compound having two or more polymerizable unsaturated bonds in the molecule (hereinafter simply referred to as "(c) a crosslinkable compound" occasionally), and (d) a crosslinking initiator. In the followings, the materials will be explained.

(a) Base Rubber

As (a) the base rubber, a natural rubber and/or a synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is a high-cis polybutadiene having a cis-1,4 bond in a proportion of 40 mass % or more, preferably 80 mass % or more, more preferably 90 mass % or more in view of its superior resilience property. The amount of the his-cis polybutadiene in (a) the base rubber is preferably 50 mass % or more, more preferably 70 mass % or more.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized by using a rare earth element catalyst. When a neodymium catalyst, which employs a neodymium compound of a lanthanum series rare earth element compound, is used, a polybutadiene rubber having a high amount of the cis-1,4 bond and a low amount of the 1,2-vinyl bond is obtained with excellent polymerization activity. Thus, such a polybutadiene rubber is particularly preferred.

The molecular weight distribution Mw/Mn (Mw: weight average molecular weight, Mn: number average molecular weight) of the high-cis polybutadiene is preferably 2.0 or more, more preferably 2.2 or more, even more preferably 2.4 or more, and most preferably 2.6 or more, and is preferably 6.0 or less, more preferably 5.0 or less, even more preferably 4.0 or less, and most preferably 3.4 or less. If the molecular weight distribution (Mw/Mn) of the high-cis polybutadiene is excessively low, the workability may be lowered, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of a column: GMHHXL (available from Tosoh Corporation), a column temperature: 40° C., and a mobile phase: tetrahydrofuran, and is a value calculated by converting based on polystyrene standard.

The Mooney viscosity ($ML_{1+4}$ (100° C.)) of the high-cis polybutadiene is preferably 30 or more, more preferably 32 or more, and even more preferably 35 or more, and is preferably 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of a preheating time: 1 minute, a rotor revolution time: 4 minutes, and a temperature: 100° C.

The rubber composition preferably contains at least two high-cis polybutadienes having a different Mooney viscosity ($ML_{1+4}$ (100° C.)) from each other as (a) the base rubber, and more preferably contains two high-cis polybutadienes. In the case that two high-cis polybutadienes are contained, it is preferable that the first high-cis polybutadiene has a Mooney viscosity ($ML_{1+4}$ (100° C.)) of less than 50, and the second high-cis polybutadiene has a Mooney viscosity ($ML_{1+4}$ (100° C.)) of 50 or more.

The Mooney viscosity ($ML_{1+4}$ (100° C.)) of the first high-cis polybutadiene is preferably 30 or more, more preferably 32 or more, and even more preferably 35 or more, and is preferably less than 50, more preferably 49 or less, and even more preferably 48 or less. The Mooney viscosity ($ML_{1+4}$ (100° C.)) of the second high-cis polybutadiene is preferably 50 or more, more preferably 52 or more, and even more preferably 54 or more, and is preferably 100 or less, more preferably 90 or less, and even more preferably 80 or less, and most preferably 70 or less.

The mass ratio (first high-cis polybutadiene/second high-cis polybutadiene) of the first high-cis polybutadiene to the second high-cis polybutadiene in (a) the base rubber is preferably 0.3 or more, more preferably 0.5 or more, and even more preferably 0.7 or more, and is preferably 3.0 or less, more preferably 2.0 or less, and even more preferably 1.5 or less.

The rubber composition also preferably contains polybutadiene rubber and polyisoprene rubber as (a) the base rubber. The Mooney viscosity ($ML_{1+4}$ (100° C.)) of the polyisoprene rubber is preferably 55 or more, more preferably 60 or more, and even more preferably 65 or more, and is preferably 120 or less, more preferably 110 or less, and even more preferably 100 or less.

The mass ratio (polybutadiene rubber/polyisoprene rubber) of the polybutadiene rubber to the polyisoprene rubber in (a) the base rubber is preferably 1 or more, more preferably 2 or more, and even more preferably 4 or more, and is preferably 20 or less, more preferably 15 or less, and even more preferably 10 or less.

(b) Co-Crosslinking Agent (b) The α,β-unsaturated carboxylic acid having 3 to 8 carbon atoms and/or the metal salt thereof is blended as the co-crosslinking agent in the rubber composition, and has an action of crosslinking a rubber molecule by graft polymerization to a base rubber molecular chain. In the case that the rubber composition contains only the α,β-unsaturated carboxylic acid having 3 to 8 carbon atoms as the co-crosslinking agent, the rubber composition preferably further contains (e) a metal compound which will be described later. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms as the co-crosslinking agent. It is noted that in the case of using the metal salt of the α,β-unsaturated carboxylic acid having 3 to 8 carbon atoms as the co-crosslinking agent, (e) the metal compound may be added as an optional component.

Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ion such as tin and zirconium. The above metal ions can be used solely or as a mixture of at least two of them. Among these metal ions, the divalent metal ion such as magnesium, calcium, zinc, barium, and cadmium are preferably used. Use of the divalent metal salt of the α,β-unsaturated carboxylic acid having 3 to 8 carbon atoms easily generates a metal crosslinking between the rubber molecules. Especially, as the divalent metal salt, the zinc salt of the α,β-unsaturated carboxylic acid having 3 to 8 carbon atoms is preferable, zinc acrylate is more preferable, because the zinc salt enhances the resilience of the resultant golf ball. It is noted that the α,β-unsaturated carboxylic acid having 3 to 8 carbon atoms and/or the metal salt thereof may be used solely, or at least two of them may be used in combination.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (d) the crosslinking initiator which will be explained below must be increased in order to obtain an appropriate hardness of the constituting member formed from the rubber composition, which tends to cause the lower resilience of the golf ball. On the other hand, if the amount of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling of the golf ball.

(c) Crosslinkable Compound Having Two or More Polymerizable Unsaturated Bonds in the Molecule Examples of the polymerizable unsaturated bond of (c) the crosslinkable compound include a carbon-carbon double bond and a carbon-carbon triple bond, and the carbon-carbon double bond is preferable. The number of the polymerizable unsaturated bonds in the molecule of (c) the crosslinkable compound is 2 or more, and is preferably 6 or less, more preferably 4 or less. (c) The crosslinkable compound may be used solely, or two or more of them may be used in combination. It is noted that (c) the crosslinkable compound excludes the α,β-unsaturated carboxylic acid having 3 to 8 carbon atoms and the metal salt thereof used as (b) the co-crosslinking agent. In addition, (c) the crosslinkable compound is preferably not encapsulated in a microcapsule.

The molecular weight of (c) the crosslinkable compound is preferably 100 or more, more preferably 130 or more, and even more preferably 150 or more, and is preferably 500 or less, more preferably 450 or less, and even more preferably 400 or less.

As (c) the crosslinkable compound, a crosslinkable compound having two or more vinyl groups in the molecule is preferable, and a crosslinkable compound having two or more (meth)acryloyl groups in the molecule is more preferable. It is noted that "(meth)acryloyl group" means "acryloyl group and/or methacryloyl group".

Examples of the crosslinkable compound having two or more vinyl groups in the molecule include divinyl benzene, trivinyl benzene, divinyl naphthalene, trivinyl naphthalene, divinyl anthracene, trivinyl anthracene, divinyl cyclohexane, and trivinyl cyclohexane.

Examples of the crosslinkable compound having two or more (meth)acryloyl groups in the molecule include an ester formed from a dihydric to hexahydric alcohol and (meth) acrylic acid. It is noted that "(meth)acrylic acid" means "acrylic acid and/or methacrylic acid". Examples of the dihydric to hexahydric alcohol include an alkane polyol having 2 to 20 carbon atoms, and an alkane diol having 2 to 20 carbon atoms and an alkane triol having 2 to 20 carbon atoms are preferable.

Examples of the crosslinkable compound having two or more (meth)acryloyl groups in the molecule include a crosslinkable compound having two (meth)acryloyl groups in the molecule, such as ethylene glycol di(meth)acrylate, propanediol di(meth)acrylate, butanediol di(meth)acrylate, pentandiol di(meth)acrylate, hexanediol di(meth)acrylate, heptanediol di(meth)acrylate, and octanediol di(meth)acrylate; and a crosslinkable compound having three (meth) acryloyl groups in the molecule, such as trimethylolpropane tri(meth)acrylate, and pentaerythritol tri(meth)acrylate. Among them, as (c) the crosslinkable compound, at least one member selected from the group consisting of trimethylolpropane tri(meth)acrylate, ethylene glycol di(meth)acrylate, and 1,6-hexanediol di(meth)acrylate is preferable.

The self-polymerization temperature (Tc) of (c) the crosslinkable compound by heat is preferably 120° C. or more, more preferably 130° C. or more, and even more preferably 140° C. or more. If the self-polymerization temperature (Tc) of (c) the crosslinkable compound by heat is 120° C. or more, the self-polymerization of the crosslinkable compound when molding the core can be suppressed, and thus bad influence on the golf ball performance can be lowered. It is noted that the upper limit of the self-polymerization temperature of (c) the crosslinkable compound by heat is not particularly limited, but it is preferably about 300° C. It is noted that in the case that two or more of the components (c) are used as the blending material, all the components (c) preferably satisfy the above range.

The amount of (c) the crosslinkable compound is preferably 2 parts by mass or more, more preferably 3 parts by mass or more, and even more preferably 5 parts by mass or more, and is preferably 39 parts by mass or less, more preferably 35 parts by mass or less, even more preferably 30 parts by mass or less, and most preferably 20 parts by mass or less, with respect to 100 parts by mass of (a) the base rubber. If the amount of (c) the crosslinkable compound is 2 parts by mass or more, the impact durability of the golf ball is further enhanced, and if the amount of (c) the crosslinkable compound is 39 parts by mass or less, lowering in the resilience of the golf ball can be suppressed.

(d) Crosslinking Initiator (d) The crosslinking initiator is blended in order to crosslink (a) the base rubber component. As (d) the crosslinking initiator, an organic peroxide is preferable. Specific examples of the organic peroxide include a dialkyl peroxide, a peroxy ester, a peroxy ketal and a hydroperoxide. Examples of the dialkyl peroxide include di(2-t-butylperoxy isopropyl) benzene (175.4° C.), dicumyl peroxide (175.2° C.), 2,5-dimethyl-2,5-di(t-butylperoxy) hexane (179.8° C.), t-butylcumylperoxy (173.3° C.), di-t-hexylperoxy (176.7° C.), di-t-butylperoxy (185.9° C.), and 2,5-dimethyl-2,5-di(t-butylperoxy) hexyne-3 (194.3° C.). Examples of the peroxy ester include t-butylperoxy maleate (167.5° C.), t-butylperoxy-3,3,5-trimethyl cyclohexanoate (166.0° C.), t-butylperoxy laurate (159.4° C.), t-butylperoxy isopropyl monocarbonate (158.8° C.), t-hexylperoxy benzoate (160.3° C.), 2,5-dimethyl-2,5-di(benzoylperoxy) hexane (158.2° C.), t-butylperoxy acetate (159.9° C.), and t-butylperoxy benzoate (166.8° C.). Examples of the peroxy ketal include 1,1-di(t-hexylperoxy)-3,3,5-trimethyl cyclohexane (147.1° C.), 1,1-di(t-hexylperoxy) cyclohexane (149.2° C.), 1,1-di (t-butylperoxy)-2-methyl cyclohexane (142.1° C.), 1,1-di(t-butylperoxy) cyclohexane (153.8° C.), 2,2-di(t-butylperoxy) butane (159.9° C.), n-butyl-4,4-di(t-butylperoxy) valerate (172.5° C.), and 2,2-di(4,4-di(t-butylperoxy) cyclohexyl) propane (153.8° C.). Examples of the hydroperoxide include p-menthane hydroperoxide (199.5° C.), and diisopropylbenzene hydroperoxide (232.5° C.). The numerical value described in the parenthesis after the compound name of the organic peroxide is a one-minute half-life temperature of the organic peroxide. These organic peroxides may be used solely, or at least two of them may be used in combination. It is noted that in the case of using two or more of the organic peroxides in combination, a difference between the maximum value and the minimum value of the one-minute half-life temperature of the used organic peroxides is preferably 25° C. or less, more preferably 10° C. or less.

The one-minute half-life temperature (Td) of (d) the crosslinking initiator is preferably less than 160° C., more preferably 158° C. or less, and even more preferably 155° C. or less. If the one-minute half-life temperature of (d) the crosslinking initiator is less than 160° C., the molding temperature of the spherical core can be set low, and the deterioration of the base rubber can be suppressed. The one-minute half-life temperature of (d) the crosslinking initiator is preferably 100° C. or more, more preferably 105° C. or more, and even more preferably 110° C. or more. If the one-minute half-life temperature of (d) the crosslinking initiator is 100° C. or more, the decomposition of (d) the crosslinking initiator when preparing the rubber composition can be suppressed. It is noted that in the case that two or more of the components (d) are used as the blending material, all the components (d) preferably satisfy the above range.

The amount of (d) the crosslinking initiator is preferably 0.1 part by mass or more, more preferably 0.5 part by mass or more, and even more preferably 0.7 part by mass or more, and is preferably 5.0 parts by mass or less, more preferably 2.5 parts by mass or less, even more preferably 2.0 parts by mass or less, and most preferably less than 1.0 part by mass, with respect to 100 parts by mass of (a) the base rubber. If the amount of (d) the crosslinking initiator is less than 0.1 part by mass, the constituting member formed from the rubber composition is so soft that the golf ball tends to have lowered resilience, and if the amount of (d) the crosslinking initiator exceeds 5.0 parts by mass, the amount of (b) the co-crosslinking agent which has been explained above must be decreased in order to obtain an appropriate hardness of the constituting member formed from the rubber composition, which tends to cause the lower resilience of the golf ball or the worsen durability of the golf ball.

(e) Metal Compound

The core rubber composition may further contain (e) a metal compound. (e) The metal compound is not particularly limited as long as it can neutralize (b) the α,β-unsaturated carboxylic acid having 3 to 8 carbon atoms in the rubber composition. Examples of (e) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. (e) The metal compound is preferably the divalent metal compound, more preferably the zinc compound. The divalent metal compound reacts with the α,β-unsaturated carboxylic acid having 3 to 8 carbon atoms, thereby forming a metal crosslinking. Use of the zinc compound provides a golf ball with high resilience. (e) The metal compound may be used solely, or at least two of them may be used in combination. The amount of (e) the metal compound can be appropriately adjusted according to the desired neutralization degree of (b) the α,β-unsaturated carboxylic acid having 3 to 8 carbon atoms.

In the case that (e) the metal compound is contained, the amount of (e) the metal compound is preferably 1 part by mass or more, more preferably 3 parts by mass or more, and even more preferably 5 parts by mass or more, and is preferably 40 parts by mass or less, more preferably 35 parts by mass or less, even more preferably 30 parts by mass or less, and mostly preferably 15 parts by mass or less, with respect to 100 parts by mass of (a) the base rubber. If the amount of (e) the metal compound is 1 part by mass or more, the golf ball has better resilience, and if the amount of (e) the metal compound is 40 parts by mass or less, lowering in the impact durability of the golf ball can be suppressed.

(f) Organic Sulfur Compound

The core rubber composition may further contain (f) an organic sulfur compound. If the rubber composition contains (f) the organic sulfur compound, the spherical core has further enhanced resilience. (f) The organic sulfur compound may be used solely, or a mixture of at least two of them may be used.

(f) The organic sulfur compound is not particularly limited, as long as it is an organic compound having a sulfur atom in the molecule thereof. Examples thereof include an organic compound having a thiol group (—SH) or a polysulfide bond having 2 to 4 sulfur atoms (-S-S-, -S-S-S-, or -S-S-S-S-), and a metal salt thereof (-SM, -S-M-S-, -S-M-S-S-, -S-S-M-S-S-, -S-M-S-S-S-, or the like; M is a metal atom). Examples of the metal salt include a monovalent metal salt such as sodium, lithium, potassium, copper (I), and silver (I), and a divalent metal salt such as zinc, magnesium, calcium, strontium, barium, titanium (II), manganese (II), iron (II), cobalt (II), nickel (II), zirconium (II), and tin (II). Furthermore, (f) the organic sulfur compound may be any one of an aliphatic compound (aliphatic thiol, aliphatic thiocarboxylic acid, aliphatic dithiocarboxylic acid, aliphatic polysulfide, or the like), a heterocyclic compound, an alicyclic compound (alicyclic thiol, alicyclic thiocarboxylic acid, alicyclic dithiocarboxylic acid, alicyclic polysulfide, or the like), and an aromatic compound.

Examples of (f) the organic sulfur compound include thiols (thiophenols and thionaphthols), polysulfides, thiurams, thiocarboxylic acids, dithiocarboxylic acids, sulfenamides, dithiocarbamates, and thiazoles.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol, and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol, and pentaiodothiophenol; and metal salts thereof. As the metal salt, a zinc salt is preferable.

Examples of the thionaphthols (naphthalene thiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof, and 2-thionaphthol, 1-thionaphthol, or the metal salt thereof is preferable. As the metal salt, a divalent metal salt is preferable, a zinc salt is more preferable. Specific examples of the metal salt include zinc salt of 1-thionaphthol, and zinc salt of 2-thionaphthol. The polysulfides are organic sulfur compounds having a polysulfide bond, and examples thereof include disulfides, trisulfides, and tetrasulfides. As the polysulfides, diphenylpolysulfides are preferable.

Examples of the diphenyl polysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide, and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl) disulfide.

Examples of the thiurams include thiuram monosulfides such as tetramethylthiuram monosulfide, thiuram disulfides such as tetramethylthiuram disulfide, tetraethylthiuram disulfide, and tetrabutylthiuram disulfide, and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (f) the organic sulfur compound, at least one member selected from the group consisting of the thiophenols and/or the metal salt thereof, the thionaphthols and/or the metal salt thereof, the diphenyl disulfides, and the thiuram disulfides is preferable, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis(pentabromophenyl) disulfide are more preferable.

In the case that (f) the organic sulfur compound is contained, the amount of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (f) the organic sulfur compound is less than 0.05 part by mass, the effect of adding (f) the organic sulfur compound may not be obtained and thus the resilience of the golf ball may not be enhanced. In addition, if the amount of (f) the organic sulfur compound exceeds 5.0 parts by mass, the obtained golf ball has a large compression deformation amount, and thus the resilience thereof may be lowered.

(f) The organic sulfur compound preferably includes at least one member selected from the group consisting of thiophenols substituted with a halogen, a metal salt of thiophenols substituted with a halogen, and diphenyl disulfides substituted with a halogen (hereinafter referred to as "(f1) halogenated organic sulfur compound" occasionally). If (f1) the halogenated organic sulfur compound is contained, the breakage of the molecular chain of the polybutadiene rubber and the growth of the grafted chain of the co-crosslinking agent can be suppressed, and thus the molecular weight can be controlled. Examples of the halogen include fluorine, chlorine, bromine, and iodine, and chlorine or bromine is preferable.

The thiophenols substituted with the halogen mean a derivate of thiophenol, wherein at least one hydrogen atom on benzene ring of thiophenol is substituted with the halogen. Examples of the thiophenols substituted with the halogen include thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; and thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol, and pentaiodothiophenol.

Examples of the metal salt of the thiophenols include a monovalent metal salt such as sodium, lithium, potassium, copper (I), and silver (I); and a divalent metal salt such as zinc, magnesium, calcium, strontium, barium, titanium (II), manganese (II), iron (II), cobalt (II), nickel (II), zirconium (II), and tin (II). As the metal salt of the thiophenols, the zinc salt of the thiophenols is preferable.

The diphenyl disulfides substituted with the halogen means a derivate of diphenyl disulfides, wherein at least one hydrogen atom on benzene ring of diphenyl disulfides is substituted with the halogen. Examples of the diphenyl disulfides substituted with the halogen include diphenyl disulfides substituted with a fluoro group, such as bis(4-fluorophenyl) disulfide, bis(2,4-difluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, and bis(pentafluorophenyl) disulfide; diphenyl disulfides substituted with a chloro group, such as bis(4-chlorophenyl) disulfide, bis(2,4-dichlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, and bis(pentachlorophenyl) disulfide; diphenyl disulfides substituted with a bromo group, such as bis(4-bromophenyl) disulfide, bis(2,4-dibromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, and bis(pentabromophenyl) disulfide; and diphenyl disulfides substituted with an iodo group, such as bis(4-iodophenyl) disulfide, bis(2,4-diiodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide, and bis(pentaiodophenyl) disulfide.

(f1) The halogenated organic sulfur compound is preferably one substituted with chlorine or bromine, more preferably 2,4-dichlorothiophenol, 2,6-dichlorothiophenol, pentachlorothiophenol, 2,4-dibromothiophenol, 2,6-dibromothiophenol, pentabromothiophenol, salts of them, bis(2,4-dichlorophenyl) disulfide, bis(2,6-dichlorophenyl) disulfide, bis(pentachlorophenyl) disulfide, bis(2,4-dibromophenyl) disulfide, bis(2,5-dibromophenyl) disulfide, and bis(pentabromophenyl) disulfide.

The amount of (f1) the halogenated organic sulfur compound is preferably 0.1 part by mass or more, more preferably 0.3 part by mass or more, and even more preferably 0.4 part by mass or more, and is preferably 2.0 parts by mass or less, more preferably 1.5 parts by mass or less, and even more preferably 1.0 part by mass or less, with respect to 100 parts by mass of (a) the base rubber. If the amount of (f1) the halogenated organic sulfur compound is 0.1 part by mass or more, the molecular weight controlling effect is higher, and thus the impact durability is further enhanced, and if the amount of (f1) the halogenated organic sulfur compound is 2.0 parts by mass or less, lowering in the shot feeling can be suppressed.

In the case that (f1) the halogenated organic sulfur compound is contained, the amount of the thiophenols substituted with the halogen, the metal salt of the thiophenols substituted with the halogen and the diphenyl disulfides substituted with the halogen in all the organic sulfur compounds is preferably 60 mass % or more, more preferably 80 mass % or more, and even more preferably 90 mass % or more. It is noted that the organic sulfur compound also preferably consists of the thiophenols substituted with the halogen, the metal salt of the thiophenols substituted with the halogen, and the diphenyl disulfides substituted with the halogen.

(g) Carboxylic Acid and/or Metal Salt Thereof

The core rubber composition may further contain (g) a carboxylic acid and/or a metal salt thereof. It is noted that (g) the carboxylic acid and/or the salt thereof excludes the α,β-unsaturated carboxylic acid having 3 to 8 carbon atoms and the metal salt thereof used as (b) the co-crosslinking agent. Examples of (g) the carboxylic acid and/or the salt thereof include a saturated fatty acid, a metal salt of a saturated fatty acid, an aromatic carboxylic acid, and a metal salt of an aromatic carboxylic acid. (g) The carboxylic acid and/or the metal salt thereof may be used solely, or a mixture of at least two of them may be used.

Examples of the saturated fatty acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, and triacontanoic acid.

Examples of the aromatic carboxylic acid include benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalene carboxylic acid, and anthracene carboxylic acid.

Examples of the cation component of (g) the metal salt of the carboxylic acid include a monovalent metal ion such as sodium, potassium, lithium, and silver; a bivalent metal ion such as magnesium, calcium, zinc, barium, cadmium, copper, cobalt, nickel, and manganese; a trivalent metal ion such as aluminum, and iron; and other ion such as tin, zirconium, and titanium. As (g) the metal salt of the carboxylic acid, a zinc salt of a carboxylic acid is preferable. These cation components may be used solely, or a mixture of at least two of them may be used.

The core rubber composition may contain additives such as a pigment, a filler for adjusting weight or the like, an antioxidant, a peptizing agent, and a softener, where necessary. In addition, the core rubber composition may contain a rubber powder obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but rutile type is preferably used because of its high opacity. The amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The filler blended in the rubber composition is used as a weight adjusting agent for mainly adjusting the weight of the golf ball obtained as a final product. The filler may be blended where necessary. Examples of the filler include an inorganic filler such as barium sulfate, tungsten powder, and molybdenum powder.

The amount of the antioxidant is preferably 0.1 part by mass or more and 1 part by mass or less with respect to 100 parts by mass of (a) the base rubber. In addition, the amount of the peptizing agent antioxidant is preferably 0.1 part by mass or more and 5 parts by mass or less with respect to 100 parts by mass of (a) the base rubber.

Core Rubber Composition

In the core rubber composition, the total amount of (b1) the α,β-unsaturated carboxylic acid component having 3 to 8 carbon atoms in (b) the co-crosslinking agent and (c) the crosslinkable compound having two or more polymerizable unsaturated bonds in the molecule is preferably 15 parts by mass or more, more preferably 16 parts by mass or more, even more preferably 19 parts by mass or more, even more preferably 21 parts by mass or more, particularly preferably 23 parts by mass or more, and most preferably 36 parts by mass or more, and is preferably 60 parts by mass or less, more preferably 58 parts by mass or less, even more preferably 56 parts by mass or less, even more preferably 50 parts by mass or less, particularly preferably 45 parts by mass or less, and most preferably 40 parts by mass or less, with respect to 100 parts by mass of (a) the base rubber. If the total amount is 15 parts by mass or more, the golf ball has a better balance between the resilience and the impact durability, and if the total amount is 60 parts by mass or less, the impact durability is better.

In the core rubber composition, the mass ratio (component (b1)/component (c)) of (b1) the α,β-unsaturated carboxylic acid component having 3 to 8 carbon atoms in (b) the co-crosslinking agent to (c) the crosslinkable compound having two or more polymerizable unsaturated bonds in the molecule is preferably 0.40 or more, more preferably 0.45 or more, even more preferably 0.50 or more, particularly preferably 0.7 or more, and most preferably 0.8 or more, and is preferably 26.0 or less, more preferably 24.0 or less, even more preferably 22.0 or less, particularly preferably 20.0 or less, more particularly preferably 15.0 or less, even more particularly preferably 10 or less, and most preferably 7 or less. If the mass ratio (component (b1)/component (c)) is 0.40 or more, the golf ball has a better balance between the resilience and the impact durability, and if the mass ratio (component (b1)/component (c)) is 26.0 or less, the impact durability is better.

The temperature difference (Td−Tc) between the self-polymerization temperature (Tc) of (c) the crosslinkable compound by heat and the one-minute half-life temperature (Td) of (d) the crosslinking initiator in the core rubber composition is preferably 30° C. or less, more preferably 25° C. or less, and even more preferably 20° C. or less. If the temperature difference (Td−Tc) is 30° C. or less, the self-polymerization of (c) the crosslinkable compound by heat when molding the core can be suppressed, and thus the obtained spherical core has further enhanced impact durability. The lower limit of the temperature difference (Td−Tc) is not particularly limited, but the lower limit is preferably about −140° C. It is noted that in the case that two or more of the components (c) and/or two or more of the components (d) are used as the blending material, all the components (c) and (d) preferably satisfy the above range.

In the first preferable embodiment of the present invention, the golf ball comprises a spherical core and at least one cover layer covering the spherical core, wherein the spherical core is formed from a core rubber composition containing (a) the base rubber, (b) the α,β-unsaturated carboxylic acid having 3 to 8 carbon atoms and/or the metal salt thereof as the co-crosslinking agent, (c) the crosslinkable compound having two or more polymerizable unsaturated bonds in the molecule, (d) the crosslinking initiator, and (e) the metal compound, wherein a molar ratio (divalent metal ion/component (b1)) of the divalent metal ion included in (b) the co-crosslinking agent and (e) the metal compound to (b1) the α,β-unsaturated carboxylic acid component having 3 to 8 carbon atoms in (b) the co-crosslinking agent ranges from 0.60 to 2.00. The impact durability is improved while maintaining the resilience by controlling the molar ratio (divalent metal ion/component (b1)) in the rubber composition constituting the spherical core.

In the core rubber composition of the first preferable embodiment, the molar ratio (divalent metal ion/component (b1)) of the divalent metal ion included in (b) the co-crosslinking agent and (e) the metal compound to (b1) the α,β-unsaturated carboxylic acid component having 3 to 8 carbon atoms in (b) the co-crosslinking agent is preferably 0.60 or more, more preferably 0.63 or more, and even more preferably 0.65 or more, and is preferably 2.00 or less, more preferably 1.95 or less, even more preferably 1.90 or less, and most preferably 1.00 or less. If the molar ratio is 0.60 or more, the impact durability can be enhanced while maintaining the high resilience, and if the molar ratio is 2.00 or less, the impact durability can be enhanced while maintaining the high resilience. In the case that the core rubber composition contains (g) a carboxylic acid and/or a metal salt thereof, the molar ratio (divalent metal ion/component (b1)) of the divalent metal ion included in (b) the co-crosslinking agent, (e) the metal compound and (g) the carboxylic acid and/or the metal salt thereof to (b1) the α,β-unsaturated carboxylic acid component having 3 to 8 carbon atoms in (b) the co-crosslinking agent preferably falls within the above range.

The core rubber composition of the first preferable embodiment preferably contains a zinc salt of the α,β-unsaturated carboxylic acid having 3 to 8 carbon atoms as (b) the co-crosslinking agent, and a zinc compound as (e) the metal compound. In this case, the molar ratio (zinc ion/component (b1)) of the zinc ion included in (b) the co-crosslinking agent and (e) the metal compound to (b1) the α,β-unsaturated carboxylic acid component having 3 to 8 carbon atoms in (b) the co-crosslinking agent is preferably 0.60 or more, more preferably 0.63 or more, and even more preferably 0.65 or more, and is preferably 2.00 or less, more preferably 1.95 or less, even more preferably 1.90 or less, and most preferably 1.00 or less. In the case that the core rubber composition contains a zinc carboxylate as (g) the carboxylic acid and/or the metal salt thereof, the molar ratio (zinc ion/component (b1)) of the zinc ion included in (b) the co-crosslinking agent, (e) the metal compound and (g) the carboxylic acid and/or the metal salt thereof to (b1) the α,β-unsaturated carboxylic acid component having 3 to 8 carbon atoms in (b) the co-crosslinking agent preferably falls within the above range.

In the core rubber composition of the first preferable embodiment, the total amount of the divalent metal ion included in (b) the co-crosslinking agent and (e) the metal compound (also including the divalent metal ion included in the component (g) in the case of containing (g) the carboxylic acid and/or the metal salt thereof) is preferably 0.15 mol or more, more preferably 0.16 mol or more, and even more preferably 0.17 mol or more, and is preferably 2.2 mol or less, more preferably 2.1 mol or less, even more preferably 2.0 mol or less, and most preferably 0.5 mol or less, with respect to 100 parts by mass of (a) the base rubber.

In the second preferable embodiment of the present invention, the golf ball comprises a spherical core and at least one cover layer covering the spherical core, wherein the spherical core is formed from a core rubber composition containing (a) the base rubber, (b) the α,β-unsaturated carboxylic acid having 3 to 8 carbon atoms and/or the metal salt thereof as the co-crosslinking agent, (c) the crosslinkable compound having two or more polymerizable unsaturated bonds in the molecule, (d) the crosslinking initiator, and (f) the organic sulfur compound, wherein (f) the organic sulfur compound is at least one member selected from the group consisting of thiophenols substituted with a halogen, a metal salt of thiophenols substituted with a halogen and diphenyl disulfides substituted with a halogen, and a mass ratio (component (c)/component (f)) of the component (c) to the component (f) ranges from 4 to 30.

It is considered that, in the second preferable embodiment, by containing (c) the crosslinkable compound and (f) the organic sulfur compound in the core rubber composition, the three-dimensional network structure can be increased by (c) the crosslinkable compound, and the breakage of the molecular chain of the polybutadiene rubber and the growth of the grafted chain of the co-crosslinking agent can be suppressed by (f) the organic sulfur compound. Thus, it is considered that the three-dimensional network structure inside the obtained spherical core can be controlled to the higher degree, and a polymeric crosslinking with a narrow molecular weight distribution is formed, thereby obtaining a golf ball having excellent resilience performance and impact durability. In addition, the resilience performance and the impact durability of the golf ball can be enhanced without sacrificing the shot feeling of the golf ball by using the component (c) and the component (f).

In the core rubber composition of the second preferable embodiment, the mass ratio (component (c)/component (f)) of (c) the crosslinkable compound to (f) the organic sulfur compound is preferably 4 or more, more preferably 7 or more, and even more preferably 10 or more, and is preferably 30 or less, more preferably 28 or less, and even more preferably 25 or less. If the mass ratio (component (c)/component (f)) is 4 or more, lowering in the shot feeling can be suppressed, and if the mass ratio (component (c)/component (f)) is 30 or less, the molecular weight controlling effect is higher, and thus the impact durability is further enhanced.

In the core rubber composition of the second preferable embodiment, the total amount of the divalent metal ion included in (b) the co-crosslinking agent and (e) the metal compound (also including the divalent metal ion included in the component (g) in the case of containing (g) the carboxylic acid and/or the metal salt thereof) is preferably 0.17 mol or more, more preferably 0.18 mol or more, and even more preferably 0.19 mol or more, and is preferably 0.25 mol or less, more preferably 0.21 mol or less, and even more preferably 0.20 mol or less, with respect to 100 parts by mass of (a) the base rubber.

In the core rubber composition of the second preferable embodiment, the molar ratio (divalent metal ion/component (b1)) of the divalent metal ion included in (b) the co-crosslinking agent and (e) the metal compound to (b1) the α,β-unsaturated carboxylic acid component having 3 to 8 carbon atoms in (b) the co-crosslinking agent is preferably 0.73 or more, more preferably 0.74 or more, and even more preferably 0.75 or more, and is preferably 0.80 or less, more preferably 0.79 or less, and even more preferably 0.78 or less. If the molar ratio is 0.73 or more and 0.80 or less, the shot feeling is better. In the case that the core rubber composition contains (g) the carboxylic acid and/or the metal salt thereof, the molar ratio (divalent metal ion/component (b1)) of the divalent metal ion included in (b) the co-crosslinking agent, (e) the metal compound and (g) the carboxylic acid and/or the metal salt thereof to (b1) the α,β-unsaturated carboxylic acid component having 3 to 8 carbon atoms in (b) the co-crosslinking agent preferably falls within the above range.

The core rubber composition of the second preferable embodiment preferably contains a zinc salt of the α,β-unsaturated carboxylic acid having 3 to 8 carbon atoms as (b) the co-crosslinking agent, and a zinc compound as (e) the metal compound. In this case, the molar ratio (zinc ion/component (b1)) of the zinc ion included in (b) the co-crosslinking agent and (e) the metal compound to (b1) the α,β-unsaturated carboxylic acid component having 3 to 8 carbon atoms in (b) the co-crosslinking agent is preferably 0.73 or more, more preferably 0.74 or more, and even more preferably 0.75 or more, and is preferably 0.80 or less, more preferably 0.79 or less, and even more preferably 0.78 or less. In the case that the core rubber composition contains a zinc carboxylate as (g) the carboxylic acid and/or the metal salt thereof, the molar ratio (zinc ion/component (b1)) of the zinc ion included in (b) the co-crosslinking agent, (e) the metal compound and (g) the carboxylic acid and/or the metal salt thereof to (b1) the α,β-unsaturated carboxylic acid component having 3 to 8 carbon atoms in (b) the co-crosslinking agent preferably falls within the above range.

The core rubber composition used in the present invention is obtained by mixing and kneading (a) the base rubber, (b) the α,β-unsaturated carboxylic acid having 3 to 8 carbon atoms and/or the metal salt thereof, (c) the crosslinkable compound, (d) the crosslinking initiator, and where necessary other additives such as (e) the metal compound, (f) the organic sulfur compound, and (g) the carboxylic acid and/or the metal salt thereof. The kneading method is not particularly limited. For example, the kneading can be conducted by using a conventional kneading machine such as a kneading roll, a banbury mixer, and a kneader.

The spherical core can be obtained by molding the kneaded rubber composition in a mold. The temperature for molding the spherical core is preferably 120° C. or more, and is preferably 170° C. or less, more preferably 150° C. or less, and even more preferably 140° C. or less. In other words, the spherical core is preferably formed by molding the core rubber composition at the molding temperature of 170° C. or less. If the molding temperature is 170° C. or less, the self-polymerization of (c) the crosslinkable compound can be suppressed, and thus the three-dimensional crosslinking structure is sufficiently formed inside the core. In addition, the molding pressure preferably ranges from 2.9 MPa to 11.8 MPa, and the molding time preferably ranges from 10 minutes to 60 minutes.

Spherical Core

The diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the cover is not excessively thick, and thus the resilience is better. On the other hand, if the diameter of the spherical core is 42.2 mm or less, the cover is not excessively thin, and thus the cover functions better.

When the spherical core has a diameter in the range from 34.8 mm to 42.2 mm, the compression deformation amount of the spherical core (shrinking amount of the spherical core along the compression direction) when applying a load from 98 N as an initial load to 1275 N as a final load to the spherical core is preferably 1.90 mm or more, more preferably 2.00 mm or more, and even more preferably 2.10 mm or more, and is preferably 5.00 mm or less, more preferably 4.80 mm or less, and even more preferably 4.60 mm or less. If the compression deformation amount is 1.90 mm or more, the shot feeling is better, and if the compression deformation amount is 5.00 mm or less, the resilience is better.

The hardness difference (Hs–Ho) of the spherical core between the surface hardness Hs and the center hardness Ho thereof is preferably 10 or more, more preferably 18 or more, and even more preferably 20 or more, and is preferably 50 or less, more preferably 48 or less, even more preferably 45 or less, and most preferably 25 or less in Shore D hardness. If the hardness difference is great, the obtained golf ball has a high launch angle and a low spin rate, thereby traveling a great flight distance.

The center hardness Ho of the spherical core is preferably 40 or more, more preferably 45 or more, and even more preferably 50 or more in Shore D hardness. If the center hardness Ho of the spherical core is 40 or more in Shore D hardness, the spherical core is not excessively soft, and thus the resilience thereof is better. In addition, the center hardness Ho of the spherical core is preferably 65 or less, more preferably 63 or less, and even more preferably 60 or less in Shore D hardness. If the center hardness Ho of the spherical core is 65 or less in Shore D hardness, the spherical core is not excessively hard, and thus the shot feeling thereof is better. The surface hardness Hs of the spherical core is preferably 70 or more, more preferably 73 or more, and even more preferably 75 or more, and is preferably 90 or less, more preferably 88 or less, even more preferably 87 or less, and most preferably 85 or less in Shore D hardness. If the surface hardness of the spherical core is 70 or more in Shore D hardness, the spherical core is not excessively soft, and thus the resilience thereof is better. In addition, if the surface hardness of the spherical core is 90 or less in Shore D hardness, the spherical core is not excessively hard, and thus the shot feeling thereof is better.

Cover

The cover is formed from a cover composition containing a resin component. Examples of the resin component include an ionomer rein; a thermoplastic polyurethane elastomer having a trade name of "Elastollan (registered trademark)" available from BASF Japan Ltd; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation.

Examples of the ionomer resin include a product prepared by neutralizing at least a part of carboxyl groups in a binary copolymer composed of an olefin and an α,β-unsaturated carboxylic acid having 3 to 8 carbon atoms with a metal ion, a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion, or a mixture thereof. The olefin is preferably an olefin having 2 to 8 carbon atoms.

Examples of the olefin include ethylene, propylene, butene, pentene, hexene, heptene, and octene. In particular, ethylene is preferable. Examples of the α,β-unsaturated carboxylic acid having 3 to 8 carbon atoms include acrylic acid, methacrylic acid, fumaric acid, maleic acid and crotonic acid. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Among these, the ionomer resin is preferably a metal ion-neutralized product of a binary copolymer composed of ethylene and (meth)acrylic acid, and a metal ion-neutralized product of a ternary copolymer composed of ethylene, (meth)acrylic acid and (meth)acrylic acid ester.

Specific examples of the ionomer resin include trade name "Himilan (registered trademark) (e.g. a binary copolymerized ionomer resin such as Himilan 1555 (Na), Himilan 1557 (Zn), Himilan 1605 (Na), Himilan 1706 (Zn), Himilan 1707 (Na), and Himilan AM3711 (Mg); and a ternary copolymerized ionomer resin such as Himilan 1856 (Na), and Himilan 1855 (Zn))" available from Du Pont-Mitsui Polychemicals Co., Ltd.

Further, examples of the ionomer resin include "Surlyn (registered trademark) (e.g. a binary copolymerized ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li); and a ternary copolymerized ionomer resin such as Surlyn 8120 (Na), Surlyn 8320 (Na), Surlyn 9320 (Zn), Surlyn 6320 (Mg), HPF 1000 (Mg), and HPF 2000 (Mg))" available from E.I. du Pont de Nemours and Company.

Further, examples of the ionomer resin include "Iotek (registered trademark) (e.g. a binary copolymerized ionomer resin such as Iotek 8000 (Na), Iotek 8030 (Na), Iotek 7010 (Zn), and Iotek 7030 (Zn); and a ternary copolymerized ionomer resin such as Iotek 7510 (Zn), and Iotek 7520 (Zn))" available from ExxonMobil Chemical Corporation.

It is noted that Na, Zn, Li, Mg, or the like described in the parenthesis after the trade name of the ionomer resin indicates a metal type of the neutralizing metal ion for the ionomer resin. The ionomer resin may be used solely, or a mixture of at least two of them may be used.

The cover composition constituting the cover of the golf ball according to the present invention preferably contains the thermoplastic polyurethane elastomer or the ionomer resin as a resin component. When the ionomer resin is used, the thermoplastic styrene elastomer is also preferably used in combination. The amount of the polyurethane or ionomer resin in the resin component of the cover composition is preferably 50 mass % or more, more preferably 60 mass % or more, and even more preferably 70 mass % or more.

The cover composition may further contain a pigment component such as a white pigment (e.g. titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or fluorescent brightener; and the like, in addition to the above resin component, as long as they do not impair the function of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. In addition, if the amount of the white pigment exceeds 10 parts by mass, the durability of the obtained cover may deteriorate.

The slab hardness of the cover composition is preferably appropriately set in accordance with the desired performance of the golf ball. For example, in case of a so-called distance golf ball which focuses on a flight distance, the slab hardness of the cover composition is preferably 50 or more, more preferably 55 or more, and even more preferably 60 or more, and is preferably 80 or less, more preferably 70 or less, and even more preferably 68 or less in Shore D hardness. If the slab hardness of the cover composition is 50 or more, the obtained golf ball has a high launch angle and a low spin rate on driver shots and iron shots, thereby travelling a great flight distance. In addition, if the slab hardness of the cover composition is 80 or less, the obtained golf ball has excellent durability. Further, in case of a so-called spin golf ball which focuses on controllability, the slab hardness of the cover composition is preferably less than 50, and is preferably 20 or more, more preferably 25 or more, and even more preferably 30 or more in Shore D hardness. If the slab hardness of the cover composition is less than 50 in Shore D hardness, the obtained golf ball travels a great flight distance on driver shots due to the core of the present invention, and readily stops on the green as well due to the high spin rate on approach shots. In addition, if the slab hardness of the cover composition is 20 or more, the abrasion resistance is enhanced. In case of a plurality of cover layers, the slab hardness of the cover composition constituting each layer can be identical to or different from each other, as long as the slab hardness of each layer falls within the above range.

Examples of the method for molding the cover include a method of molding the cover composition into hollow shells, covering the core with a plurality of the hollow shells and performing compression molding (preferably a method of molding the cover composition into hollow half shells, covering the core with two of the hollow half shells, and performing compression molding); and a method of injection molding the cover composition directly onto the core.

When molding the cover by the compression molding method, half shells can be molded by either a compression molding method or an injection molding method, and the compression molding method is preferred. The conditions for compression molding the cover composition into half shells can be, for example, a pressure of 1 MPa or more and 20 MPa or less, and a molding temperature of −20° C. or more and 70° C. or less relative to the flow beginning temperature of the cover composition. If the above molding conditions are adopted, the half shells having a uniform thickness can be formed. Examples of the method of using the half shells to mold the cover include a method of covering the core with two of the half shells and performing compression molding. The conditions for compression molding the half shells into the cover can be, for example, a molding pressure of 0.5 MPa or more and 25 MPa or less, and a molding temperature of −20° C. or more and 70° C. or less relative to the flow beginning temperature of the cover composition. If the above molding conditions are adopted, the cover having a uniform thickness can be formed.

When molding the cover by injection molding the cover composition, the cover composition extruded in a pellet form may be used for the injection molding. Alternatively, the cover materials such as the base resin component, the pigment, or the like may be dry blended, followed by directly injection molding the blended material. It is preferred to use upper and lower molds for cover molding, each having a hemispherical cavity and pimples, wherein a part of the pimples also serves as a retractable hold pin. When molding the cover by the injection molding method, the hold pin is protruded to hold the core charged into the mold, and the cover composition is charged and cooled to mold the cover. For example, the cover composition heated to 200° C. to 250° C. is charged for 0.5 to 5 seconds into a mold held under a pressure of 9 MPa to 15 MPa, and cooled for 10 to 60 seconds, and the mold is opened to eject the golf ball.

The concave portions called "dimples" are usually formed on the surface of the cover when molding the cover. The total number of the dimples formed on the cover is preferably 200 or more and 500 or less. If the total number of the dimples is less than 200, the dimple effect is hardly obtained. In addition, if the total number of the dimples exceeds 500, the dimple effect is hardly obtained because the size of the respective dimples is small. The shape (shape in a plan view) of the dimples includes, for example, without limitation, a circle; a polygonal shape such as a roughly triangular shape, a roughly quadrangular shape, a roughly pentagonal shape, a roughly hexagonal shape; and other irregular shape. The shape of the dimples may be employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the obtained golf ball has better resilience and shot feeling. The thickness of the cover is preferably 0.3 mm or more, more preferably 0.5 mm or more, even more preferably 0.8 mm or more, and most preferably 1.0 mm or more. If the thickness of the cover is less than 0.3 mm, the cover may have deteriorated durability and wear resistance. If the cover has a plurality of layers, it is preferred that the total thickness of the cover layers falls within the above range.

The golf ball body with the cover formed thereon is ejected from the mold, and as necessary, the golf ball body is preferably subjected to surface treatments such as deburring, cleaning, and sandblast. In addition, if desired, a paint film or a mark may be formed thereon. The thickness of the paint film is not particularly limited, but the thickness is preferably 5 μm or more, more preferably 7 μm or more, and is preferably 50 μm or less, more preferably 40 μm or less, and even more preferably 30 μm or less. If the thickness of the paint film is less than 5 μm, the paint film is easy to wear off due to the continued use of the golf ball, and if the thickness of the paint film exceeds 50 μm, the effect of the dimples is reduced, and thus the flight performance of the golf ball may be lowered.

Golf Ball

The construction of the golf ball according to the present invention is not particularly limited, as long as the golf ball comprises a spherical core, and at least one cover layer covering the spherical core. The spherical core preferably has a single layered structure. Unlike the multi-layered structure, the single layered spherical core does not have an energy loss at the interface of the multi-layered structure when hitting, and thus has an enhanced resilience. In addition, the cover has a structure composed of at least one layer, and may be, for example, a single layered structure, or a multi-layered structure composed of at least two layers. Examples of the golf ball according to the present invention include a two-piece golf ball composed of a spherical core and a single layered cover disposed around the spherical core; a multi-piece golf ball (including a three-piece golf ball) composed of a spherical core, and at least two cover layers disposed around the spherical core; and a wound golf ball composed of a spherical core, a rubber thread layer disposed around the spherical core, and a cover disposed around the rubber thread layer. The present invention can be suitably applied to any one of the above golf balls.

The golf ball according to the present invention preferably has a diameter ranging from 40 mm to 45 mm. In light of satisfying a regulation of US Golf Association (USGA), the diameter is particularly preferably 42.67 mm or more. In light of prevention of the air resistance, the diameter is more preferably 44 mm or less, particularly preferably 42.80 mm or less. In addition, the golf ball according to the present invention preferably has a mass of 40 g or more and 50 g or less. In light of obtaining greater inertia, the golf ball more preferably has a mass of 44 g or more, particularly preferably 45.00 g or more. In light of satisfying a regulation of USGA, the golf ball particularly preferably has a mass of 45.93 g or less.

When the golf ball according to the present invention has a diameter in the range of from 40 mm to 45 mm, the compression deformation amount of the golf ball (shrinking amount of the golf ball along the compression direction) when applying a load from an initial load of 98 N to a final load of 1275 N to the golf ball is preferably 2.0 mm or more, more preferably 2.2 mm or more, and even more preferably 2.4 mm or more, and is preferably 4.0 mm or less, more preferably 3.5 mm or less, and even more preferably 3.4 mm or less. If the compression deformation amount is 2.0 mm or more, the golf ball does not become excessively hard, and thus the shot feeling thereof is better. On the other hand, if the compression deformation amount is 4.0 mm or less, the resilience is enhanced.

The FIGURE is a partially cutaway cross-sectional view showing a golf ball 1 according to one embodiment of the present invention. The golf ball 1 comprises a spherical core 2, and a cover 3 covering the spherical core 2. On the surface of the cover, a plurality of dimples 31 are formed. On the surface of the golf ball 1, a part other than the dimples 31 is a land 32. The golf ball 1 further comprises a paint layer and a mark layer on the outer side of the cover 3, but these layers are not depicted.

EXAMPLES

Hereinafter, the present invention will be described in detail by way of examples. However, the present invention is not limited to the examples described below, and various changes and modifications without departing from the gist of the present invention are included in the scope of the present invention.

[Evaluation Method]

(1) Polymerization Temperature of (c) Crosslinkable Compound by Heat

The polymerization temperature of (c) the crosslinkable compound by heat was measured with a differential scanning calorimeter (DSC). The measuring conditions were a temperature rising rate of 10° C./min and a measuring temperature range of from −10° C. to 250° C. The temperature at the peak top of the obtained DSC curve was read and adopted as the polymerization temperature by heat.

(2) Core Hardness (Shore D Hardness)

The hardness measured at the surface of the core was adopted as the surface hardness of the core. In addition, the core was cut into two hemispheres to obtain a cut plane, and the hardness measured at the central point of the cut plane was adopted as the center hardness of the core. The hardness was measured with an automatic hardness tester (Digitest II, available from Bareiss company) using a detector of "Shore D".

(3) Compression Deformation Amount (Mm)

The deformation amount of the core or golf ball along the compression direction (shrinking amount of the core or golf ball along the compression direction), when applying a load from 98 N as an initial load to 1275 N as a final load to the core or golf ball, was measured.

(4) Coefficient of Restitution

A metal cylindrical object with a mass of 198.4 g was allowed to collide with each golf ball at a speed of 40 m/sec, and the speeds of the cylindrical object and the golf ball before and after the collision were measured. Based on these speeds and the mass of each object, the coefficient of restitution of each golf ball was calculated. The measurement was conducted by using twelve samples for each golf ball, and the average value thereof was adopted as the coefficient of restitution of the golf ball. It is noted that the coefficient of restitution of the golf balls No. 1 to 19 is shown as a difference from the coefficient of restitution of the golf ball No. 18, and the coefficient of restitution of the golf balls No. 20 to 39 is shown as a difference from the coefficient of restitution of the golf ball No. 35.

(5) Flight Distance on Driver Shots

A W #1 driver provided with a metal head (XXIO S, Loft angel: 11°, available from Dunlop Sports Limited) was installed on a swing robot M/C available from Golf Laboratories, Inc. The golf ball was hit at a head speed of 40 m/sec, and the flight distance (the distance from the launch point to the stop point) of the golf ball was measured. It is noted that the measurement was conducted twelve times for each golf ball, and the average value thereof was adopted as the measurement value for the golf ball. It is noted that the flight distance of the golf balls No. 1 to 19 is shown as a difference from the flight distance of the golf ball No. 18 (flight distance difference=flight distance of each golf ball−flight distance of golf ball No. 18), and the flight distance of the golf balls No. 20 to 39 is shown as a difference from the flight distance of the golf ball No. 35 (flight distance difference=flight distance of each golf ball−flight distance of golf ball No. 35).

(6) Durability

An air gun was used to allow twelve samples for each golf ball to collide with a metal plate repeatedly at a speed of 45 m/sec until the golf ball was broken, and the repeated number was counted. It is noted that the durability of the golf ball No. 16 was defined as 100, and the durability of each golf ball was represented by converting the durability of each golf ball into this index.

[Production of Golf Ball]

(1) Production of Core

The rubber compositions having the formulations shown in Tables 1 to 4 were kneaded and heat pressed in upper and lower molds, each having a hemispherical cavity, under the conditions shown in Tables, to obtain spherical cores having a diameter of 39.8 mm. It is noted that an appropriate amount of barium sulfate was added such that the obtained golf balls had a mass of 45.4 g.

TABLE 1

| | | | Golf ball No. | | | | | |
|---|---|---|---|---|---|---|---|---|
| | | | 1 | 2 | 3 | 4 | 5 | 6 |
| Core rubber composition | Formulation (parts by mass) | Polybutadiene rubber | 100 | 100 | 100 | 100 | 100 | 100 |
| | | ZN-DA90S | 35 | 34 | 33 | 32 | 28 | 26 |
| | | Zinc oxide | 5 | 5 | 5 | 5 | 5 | 5 |
| | | Barium sulfate | AA* | AA* | AA* | AA* | AA* | AA* |
| | | PERHEXA C-40 | 0.95 | 0.95 | 0.95 | 0.95 | 0.95 | 0.95 |
| | | PERHEXA HC | — | — | — | — | — | — |
| | | PERCUMYL D | — | — | — | — | — | — |
| | | TMPT | 1 | 3 | 5 | 10 | 20 | 30 |
| | | A-TMPT | — | — | — | — | — | — |
| | Total amount of component (b1) and component (c) (parts by mass) | | 22.6 | 24.0 | 25.3 | 29.7 | 37.3 | 46.0 |
| | Mass ratio (component (b1)/component (c)) | | 21.6 | 7.0 | 4.1 | 2.0 | 0.9 | 0.5 |
| | Amount of divalent metal ion (mol) | | 0.22 | 0.21 | 0.21 | 0.21 | 0.19 | 0.18 |
| | Molar ratio (divalent metal ion/component (b1)) | | 0.72 | 0.73 | 0.73 | 0.74 | 0.77 | 0.79 |
| Core | Molding conditions | Molding temperature (° C.) | 130 | 130 | 130 | 130 | 130 | 130 |
| | | Molding time (minute) | 20 | 20 | 20 | 20 | 20 | 20 |
| | Core properties | Compression deformation amount (mm) | 3.3 | 3.3 | 3.3 | 3.3 | 3.3 | 3.3 |
| | | Coefficient of restitution | 0.033 | 0.031 | 0.028 | 0.025 | 0.016 | 0.008 |
| | | Center hardness Ho (Shore D) | 55.6 | 55.7 | 58.5 | 55.8 | 57.7 | 60.8 |
| | | Surface hardness Hs (Shore D) | 78.3 | 78.1 | 77.9 | 78.7 | 78.1 | 78.4 |
| | | Hardness difference (Hs − Ho) | 22.7 | 22.4 | 19.4 | 22.9 | 20.4 | 17.6 |

TABLE 1-continued

| | | | | | | | |
|---|---|---|---|---|---|---|---|
| Ball evaluation | Compression deformation amount (mm) | 3.0 | 3.0 | 3.0 | 3.0 | 3.0 | 3.0 |
| | Flight distance (yds) | 5.6 | 5.3 | 4.8 | 4.2 | 2.8 | 1.4 |
| | Durability | 100 | 120 | 140 | 160 | 180 | 190 |

| | | | Golf ball No. | | | | |
|---|---|---|---|---|---|---|---|
| | | | 7 | 8 | 9 | 10 | 11 |
| Core rubber composition | Formulation (parts by mass) | Polybutadiene rubber | 100 | 100 | 100 | 100 | 100 |
| | | ZN-DA90S | 24 | 35 | 33 | 32 | 24 |
| | | Zinc oxide | 5 | 5 | 5 | 5 | 5 |
| | | Barium sulfate | AA* | AA* | AA* | AA* | AA* |
| | | PERHEXA C-40 | 0.95 | 0.95 | 0.95 | 0.95 | 0.95 |
| | | PERHEXA HC | — | — | — | — | — |
| | | PERCUMYL D | — | — | — | — | — |
| | | TMPT | 40 | — | — | — | — |
| | | A-TMPT | — | 1 | 5 | 10 | 40 |
| | Total amount of component (b1) and component (c) (parts by mass) | | 54.8 | 22.6 | 25.3 | 29.7 | 54.8 |
| | Mass ratio (component (b1)/component (c)) | | 0.4 | 21.6 | 4.1 | 2.0 | 0.4 |
| | Amount of divalent metal ion (mol) | | 0.17 | 0.22 | 0.21 | 0.21 | 0.17 |
| | Molar ratio (divalent metal ion/component (b1)) | | 0.81 | 0.72 | 0.73 | 0.74 | 0.81 |
| Core | Molding conditions | Molding temperature (° C.) | 130 | 130 | 130 | 130 | 130 |
| | | Molding time (minute) | 20 | 20 | 20 | 20 | 20 |
| | Core properties | Compression deformation amount (mm) | 3.3 | 3.3 | 3.3 | 3.3 | 3.3 |
| | | Coefficient of restitution | 0.000 | 0.032 | 0.027 | 0.024 | 0.000 |
| | | Center hardness Ho (Shore D) | 62.6 | 55.5 | 58.0 | 56.1 | 63.0 |
| | | Surface hardness Hs (Shore D) | 77.8 | 78.1 | 78.5 | 77.8 | 77.6 |
| | | Hardness difference (Hs − Ho) | 15.2 | 22.6 | 20.5 | 21.7 | 14.6 |
| Ball evaluation | Compression deformation amount (mm) | | 3.0 | 3.0 | 3.0 | 3.0 | 3.0 |
| | Flight distance (yds) | | 0.0 | 5.4 | 4.6 | 4.1 | 0.0 |
| | Durability | | 200 | 100 | 140 | 160 | 200 |

AA*: Appropriate amount

TABLE 2

| | | | Golf ball No. | | | | | | | |
|---|---|---|---|---|---|---|---|---|---|---|
| | | | 12 | 13 | 14 | 15 | 16 | 17 | 18 | 19 |
| Core rubber composition | Formulation (parts by mass) | Polybutadiene rubber | 100 | 100 | 100 | 100 | 100 | 100 | 100 | 100 |
| | | ZN-DA90S | 32 | 32 | 32 | 32 | 35 | 32 | 32 | 32 |
| | | Zinc oxide | 5 | 5 | 5 | 5 | 5 | 5 | 0 | 40 |
| | | Barium sulfate | AA* | AA* | AA* | AA* | AA* | AA* | AA* | AA* |
| | | PERHEXA C-40 | 0.95 | 0.95 | — | — | 0.95 | — | 0.95 | 0.95 |
| | | PERHEXA HC | — | — | — | — | — | 0.6 | — | — |
| | | PERCUMYL D | — | — | 0.8 | 0.8 | — | — | — | — |
| | | TMPT | — | — | 10 | — | — | 10 | 10 | 10 |
| | | A-TMPT | — | — | — | 10 | — | — | — | — |
| | | EGDMA | 5.86 | — | — | — | — | — | — | — |
| | | HDDMA | — | 7.52 | — | — | — | — | — | — |
| | Total amount of component (b1) and component (c) (parts by mass) | | 25.6 | 27.2 | 29.7 | 29.7 | 21.6 | 29.7 | 29.7 | 29.7 |
| | Mass ratio (component (b1)/component (c)) | | 3.4 | 2.6 | 2.0 | 2.0 | — | 2.0 | 2.0 | 2.0 |
| | Amount of divalent metal ion (mol) | | 0.21 | 0.21 | 0.21 | 0.21 | 0.22 | 0.21 | 0.14 | 0.64 |
| | Molar ratio (divalent metal ion/component (b1)) | | 0.74 | 0.74 | 0.74 | 0.74 | 0.72 | 0.74 | 0.52 | 2.29 |
| Core | Molding conditions | Molding temperature (° C.) | 130 | 130 | 170 | 170 | 130 | 130 | 130 | 130 |
| | | Molding time (minute) | 20 | 20 | 20 | 20 | 20 | 20 | 20 | 20 |
| | Core properties | Compression deformation amount (mm) | 3.3 | 3.3 | 3.3 | 3.3 | 3.3 | 3.3 | 3.3 | 3.3 |
| | | Coefficient of restitution | 0.023 | 0.023 | 0.025 | 0.025 | 0.033 | 0.025 | 0.000 | 0.025 |
| | | Center hardness Ho (Shore D) | 53.4 | 53.7 | 54.8 | 55.3 | 55.7 | 59.2 | 62.6 | 54.8 |
| | | Surface hardness Hs (Shore D) | 76.4 | 76.3 | 79.7 | 79.4 | 78.5 | 77.9 | 77.8 | 79.7 |
| | | Hardness difference (Hs − Ho) | 23.0 | 22.6 | 24.9 | 24.1 | 22.8 | 18.7 | 15.2 | 22.9 |
| | Ball evaluation | Compression deformation amount (mm) | 3.0 | 3.0 | 3.0 | 3.0 | 3.0 | 3.0 | 3.0 | 3.0 |
| | | Flight distance (yds) | 4.0 | 4.0 | 4.2 | 4.2 | 5.6 | 4.2 | 0.0 | 4.2 |
| | | Durability | 140 | 140 | 90 | 90 | 100 | 160 | 105 | 90 |

AA*: Appropriate amount

TABLE 3

|  |  |  | Golf ball No. | | | | | |
|---|---|---|---|---|---|---|---|---|
|  |  |  | 20 | 21 | 22 | 23 | 24 | 25 |
| Core rubber composition | Formulation (Parts by mass) | Polybutadiene rubber | 100 | 100 | 100 | 100 | 100 | 100 |
|  |  | ZN-DA90S | 33 | 33 | 33 | 30 | 28 | 26 |
|  |  | Zinc oxide | 5 | 5 | 5 | 5 | 5 | 5 |
|  |  | Barium sulfate | AA* | AA* | AA* | AA* | AA* | AA* |
|  |  | PBDS | 0.3 | 0.4 | 0.5 | 0.6 | 0.9 | 1.2 |
|  |  | PERHEXA C-40 | 0.95 | 0.95 | 0.95 | 0.95 | 0.95 | 0.95 |
|  |  | TMPT | 1 | 3 | 5 | 10 | 20 | 30 |
|  |  | A-TMPT | — | — | — | — | — | — |
|  | Mass ratio (component (c)/component (f)) | | 3.3 | 7.5 | 10.0 | 16.7 | 22.2 | 25.0 |
|  | Total amount of component (b1) and component (c) (parts by mass) | | 21.3 | 23.3 | 25.3 | 28.5 | 37.3 | 46.0 |
|  | Mass ratio (component (b1)/component (c)) | | 20.3 | 6.8 | 4.1 | 1.8 | 0.9 | 0.5 |
|  | Amount of divalent metal ion (mol) | | 0.21 | 0.21 | 0.21 | 0.20 | 0.19 | 0.18 |
|  | Molar ratio (divalent metal ion/component (b1)) | | 0.73 | 0.73 | 0.73 | 0.75 | 0.77 | 0.79 |
| Core | Molding conditions | Molding temperature (° C.) | 130 | 130 | 130 | 130 | 130 | 130 |
|  |  | Molding time (minute) | 20 | 20 | 20 | 20 | 20 | 20 |
|  | Properties | Compression deformation amount (mm) | 3.3 | 3.3 | 3.3 | 3.3 | 3.3 | 3.3 |
|  |  | Coefficient of restitution | 0.000 | 0.001 | 0.003 | 0.008 | 0.015 | 0.008 |
|  |  | Center hardness Ho (Shore D) | 55.6 | 55.7 | 58.5 | 55.8 | 57.7 | 60.8 |
|  |  | Surface hardness Hs (Shore D) | 78.3 | 78.1 | 77.9 | 78.7 | 78.1 | 78.4 |
|  |  | Hardness difference (Hs − Ho) | 22.7 | 22.4 | 19.4 | 22.9 | 20.4 | 17.6 |
| Ball evaluation |  | Compression deformation amount (mm) | 3.0 | 3.0 | 3.0 | 3.0 | 3.0 | 3.0 |
|  |  | Flight distance (yds) | 0 | 0.2 | 0.5 | 1.3 | 2.6 | 1.3 |
|  |  | Durability | 100 | 120 | 140 | 160 | 180 | 190 |

|  |  |  | Golf ball No. | | | | |
|---|---|---|---|---|---|---|---|
|  |  |  | 26 | 27 | 28 | 29 | 30 |
| Core rubber composition | Formulation (Parts by mass) | Polybutadiene rubber | 100 | 100 | 100 | 100 | 100 |
|  |  | ZN-DA90S | 24 | 33 | 33 | 30 | 24 |
|  |  | Zinc oxide | 5 | 5 | 5 | 5 | 5 |
|  |  | Barium sulfate | AA* | AA* | AA* | AA* | AA* |
|  |  | PBDS | 1.2 | 0.3 | 0.5 | 0.6 | 1.2 |
|  |  | PERHEXA C-40 | 0.95 | 0.95 | 0.95 | 0.95 | 0.95 |
|  |  | TMPT | 40 | — | — | — | — |
|  |  | A-TMPT | — | 1 | 5 | 10 | 40 |
|  | Mass ratio (component (c)/component (f)) | | 33.3 | 3.3 | 10.0 | 16.7 | 33.3 |
|  | Total amount of component (b1) and component (c) (parts by mass) | | 54.8 | 21.3 | 25.3 | 28.5 | 54.8 |
|  | Mass ratio (component (b1)/component (c)) | | 0.4 | 20.3 | 4.1 | 1.8 | 0.4 |
|  | Amount of divalent metal ion (mol) | | 0.17 | 0.21 | 0.21 | 0.20 | 0.17 |
|  | Molar ratio (divalent metal ion/component (b1)) | | 0.81 | 0.73 | 0.73 | 0.75 | 0.81 |
| Core | Molding conditions | Molding temperature (° C.) | 130 | 130 | 130 | 130 | 130 |
|  |  | Molding time (minute) | 20 | 20 | 20 | 20 | 20 |
|  | Properties | Compression deformation amount (mm) | 3.3 | 3.3 | 3.3 | 3.3 | 3.3 |
|  |  | Coefficient of restitution | −0.006 | 0.000 | 0.002 | 0.005 | −0.006 |
|  |  | Center hardness Ho (Shore D) | 62.6 | 55.5 | 58.0 | 56.1 | 63.0 |
|  |  | Surface hardness Hs (Shore D) | 77.8 | 78.1 | 78.5 | 77.8 | 77.6 |
|  |  | Hardness difference (Hs − Ho) | 15.2 | 22.6 | 20.5 | 21.7 | 14.6 |
| Ball evaluation |  | Compression deformation amount (mm) | 3.0 | 3.0 | 3.0 | 3.0 | 3.0 |
|  |  | Flight distance (yds) | −1.0 | 0 | 0.3 | 0.9 | −1.0 |
|  |  | Durability | 200 | 100 | 140 | 160 | 200 |

AA*: Appropriate amount

TABLE 4

|  |  |  | Golf ball No. | | | | | | | | |
|---|---|---|---|---|---|---|---|---|---|---|---|
|  |  |  | 31 | 32 | 33 | 34 | 35 | 36 | 37 | 38 | 39 |
| Core rubber composition | Formulation (parts by mass) | Polybutadiene rubber | 100 | 100 | 100 | 100 | 100 | 100 | 100 | 100 | 100 |
|  |  | ZN-DA90S | 33 | 33 | 28 | 28 | 32 | 33 | 27 | 30 | 35 |
|  |  | Zinc oxide | 5 | 5 | 5 | 5 | 5 | 5 | 5 | 5 | 5 |
|  |  | Barium sulfate | AA* | AA* | AA* | AA* | AA* | AA* | AA* | AA* | AA* |
|  |  | PBDS | 0.6 | 0.6 | 0.6 | 0.6 | 0.3 | 0.6 | 0.6 | — | — |
|  |  | PERHEXA C-40 | 0.95 | 0.95 | — | — | 0.95 | 0.95 | — | 0.95 | 0.95 |
|  |  | PERHEXA HC | — | — | — | — | — | — | 0.6 | — | — |

TABLE 4-continued

| | | | Golf ball No. | | | | | | | | |
|---|---|---|---|---|---|---|---|---|---|---|---|
| | | | 31 | 32 | 33 | 34 | 35 | 36 | 37 | 38 | 39 |
| | | PERCUMYL D | — | — | 0.8 | 0.8 | — | — | — | — | — |
| | | TMPT | — | — | 10 | — | — | — | 10 | 10 | — |
| | | A-TMPT | — | — | — | 10 | — | — | — | — | — |
| | | EGDMA | 5.86 | — | — | — | — | — | — | — | — |
| | | HDDMA | — | 7.52 | — | — | — | — | — | — | — |
| | | Mass ratio (component (c)/component (f)) | 9.8 | 12.5 | 16.7 | 16.7 | — | — | 16.7 | 16.7 | — |
| | | Total amount of component (b1) and component (c) (parts by mass) | 26.2 | 27.9 | 27.3 | 27.3 | — | — | 26.6 | 28.5 | — |
| | | Mass ratio (component (b1)/component (c)) | 3.5 | 2.7 | 1.7 | 1.7 | — | — | 1.7 | 1.8 | — |
| | | Amount of divalent metal ion (mol) | 0.21 | 0.21 | 0.19 | 0.19 | 0.21 | 0.21 | 0.18 | 0.20 | 0.22 |
| | | Molar ratio (divalent metal ion/component (b1)) | 0.73 | 0.73 | 0.77 | 0.77 | 0.74 | 0.73 | 0.78 | 0.75 | 0.72 |
| Core | Molding conditions | Molding temperature (° C.) | 130 | 130 | 170 | 170 | 130 | 130 | 130 | 130 | 130 |
| | | Molding time (minute) | 20 | 20 | 20 | 20 | 20 | 20 | 20 | 20 | 20 |
| | Properties | Compression deformation amount (mm) | 3.3 | 3.3 | 3.3 | 3.3 | 3.3 | 3.3 | 3.3 | 3.3 | 3.3 |
| | | Coefficient of restitution | 0.002 | 0.004 | 0.000 | 0.000 | 0.000 | 0.008 | 0.008 | −0.010 | −0.005 |
| | | Center hardness Ho (Shore D) | 53.4 | 53.7 | 54.8 | 55.3 | 55.7 | 55.6 | 59.2 | 55.7 | 55.5 |
| | | Surface hardness Hs (Shore D) | 76.4 | 76.3 | 79.7 | 79.4 | 78.5 | 78.6 | 77.9 | 78.3 | 78.0 |
| | | Hardness difference (Hs − Ho) | 23.0 | 22.6 | 24.9 | 24.1 | 22.8 | 23.0 | 18.7 | 22.6 | 22.5 |
| Ball evaluation | | Compression deformation amount (mm) | 3.0 | 3.0 | 3.0 | 3.0 | 3.0 | 3.0 | 3.0 | 3.0 | 3.0 |
| | | Flight distance (yds) | 0.3 | 0.8 | 0 | 0 | 0 | 1.3 | 1.3 | −1.8 | −0.9 |
| | | Durability | 140 | 140 | 90 | 90 | 100 | 90 | 160 | 160 | 100 |

AA*: Appropriate amount

The materials used in Tables 1-4 are shown as follows.

Polybutadiene rubber: BR730 (high-cis polybutadiene rubber (cis-1,4 bond content=95 mass %, 1,2-vinyl bond content=1.3 mass %, Moony viscosity ($ML_{1+4}$ (100° C.)=55, molecular weight distribution (Mw/Mn)=3)) available from JSR Corporation ZN-DA90S: zinc acrylate (product containing 10 mass % of zinc stearate) available from Nisshoku Techno Fine Chemical Co., Ltd.

Zinc oxide: "Ginrei R" available from Toho Zinc Co., Ltd.

Barium sulfate: "Barium sulfate BD" available from Sakai Chemical industry Co.

PBDS: bis(pentabromophenyl) disulfide

PERHEXA (registered trademark) C-40: 1,1-di(t-butylperoxy) cyclohexane (one-minute half-life temperature: 153.8° C.) available from NOF Corporation PERHEXA HC: 1,1-di(t-hexylperoxy) cyclohexane (one-minute half-life temperature: 149.2° C.) available from NOF Corporation PERCUMYL (registered trademark) D: dicumyl peroxide (one-minute half-life temperature: 175.2° C.) available from NOF Corporation TMPT: trimethylolpropane trimethacrylate (self-polymerization temperature by heat: 140° C.) available from Shin-Nakamura Chemical Co., Ltd.

A-TMPT: trimethylolpropane triacrylate available from Shin-Nakamura Chemical Co., Ltd.

EGDMA: ethylene glycol dimethacrylate available from Tokyo Chemical industry Co., Ltd.

HDDMA: 1,6-hexanediol dimethacrylate available from Tokyo Chemical industry Co., Ltd.

(2) Molding of Cover

The materials shown in Table 5 were mixed with a twin-screw kneading extruder to obtain the cover composition in a pellet form. The extruding conditions were a screw diameter of 45 mm, a screw rotational speed of 200 rpm, and screw L/D=35, and the mixtures were heated to 160° C. to 230° C. at the die position of the extruder.

TABLE 5

| Cover resin composition | | |
|---|---|---|
| Formulation (parts by mass) | Himilan 1605 | 50 |
| | Himilan 1706 | 50 |
| | Titanium oxide | 4 |
| Slab hardness (Shore D) | | 65 |

The materials used in Table 5 are shown as follows.

Himilan (registered trademark) 1605: sodium ion neutralized ethylene-methacrylic acid copolymer ionomer resin available from Du Pont-Mitsui Polychemicals Co., Ltd.

Himilan 1706: zinc ion neutralized ethylene-methacrylic acid copolymer ionomer resin available from Du Pont-Mitsui Polychemicals Co., Ltd.

Titanium oxide: A220 available from Ishihara Sangyo Kaisha, Ltd.

The cover composition obtained above was injection molded on the spherical core obtained as described above to mold the cover covering the spherical core. Upper and lower molds for molding the cover have a hemispherical cavity and pimples, wherein a part of the pimples also serves as a retractable hold pin. When molding the cover, the hold pin was protruded to hold the core charged into the mold, and the resin heated to 210° C. to 260° C. was charged for 0.3 second into the mold held under a pressure of 80 tons, and cooled for 30 seconds, and the mold was opened to eject the golf ball.

The surface of the obtained golf ball body was subjected to a sandblast treatment, and a mark was formed thereon. Then, a clear paint was applied to the golf ball body, and the paint was dried in an oven of 40° C. to obtain a golf ball having a diameter of 42.8 mm and a mass of 45.4 g. The evaluation results of the obtained golf balls are shown in Tables 1 and 2.

The golf balls No. 1 to 13 and 17 are the cases that the core rubber composition thereof contains the components (a) to (e) and the molar ratio (divalent metal ion/component (b1)) ranges from 0.60 to 2.00. Each of these golf balls No. 1 to 13 and 17 travels a great flight distance and has excellent impact durability.

The golf ball No. 18 is the case that the core rubber composition thereof contains the components (a) to (e) but the molar ratio (divalent metal ion/component (b1)) is less than 0.60. The golf ball No. 18 travels a short flight distance.

The golf ball No. 19 is the case that the core rubber composition thereof contains the components (a) to (e) but the molar ratio (divalent metal ion/component (b1)) exceeds 2.00. The golf ball No. 19 has poor impact durability although it travels a great flight distance.

The golf balls No. 21 to 25, 28, 29, 31, 32 and 37 are the cases that the core rubber composition thereof contains the components (a) to (d) and the component (f) and the mass ratio (component (c)/component (f)) ranges from 4 to 30. Each of these golf balls No. 21 to 25, 28, 29, 31, 32 and 37 has excellent resilience performance as well as excellent impact durability.

The golf balls No. 20 and 27 are the cases that the core rubber composition thereof contains the components (a) to (d) and the component (f) but the mass ratio (component (c)/component (f)) is less than 4. Both of the resilience performance and the impact durability of these golf balls No. 20 and 27 are not improved.

The golf balls No. 26 and 30 are the cases that the core rubber composition thereof contains the components (a) to (d) and the component (f) but the mass ratio (component (c)/component (f)) exceeds 30. These golf balls No. 26 and 30 have poor resilience performance although they have excellent impact durability.

The golf balls No. 35 and 36 are the cases that the core rubber composition thereof does not contain the component (c). These golf balls No. 35 and 36 have poor impact durability.

The golf ball No. 38 is the case that the core rubber composition thereof does not contain the component (f). The golf ball No. 38 has poor resilience performance.

The golf ball No. 39 is the case that the core rubber composition thereof does not contain the component (c) and the component (f). The golf ball No. 39 has poor resilience performance and impact durability.

This application is based on Japanese patent applications No. 2017-252824 and No. 2017-252825 filed on Dec. 28, 2017, the contents of which are hereby incorporated by reference.

The invention claimed is:

1. A golf ball comprising a single layered spherical core and at least one cover layer covering the single layered spherical core, wherein the single layered spherical core is formed from a core rubber composition containing
   (a) a base rubber,
   (b) an $\alpha,\beta$-unsaturated carboxylic acid having 3 to 8 carbon atoms and/or a metal salt thereof as a co-crosslinking agent,
   (c) a crosslinkable compound having two or more polymerizable unsaturated bonds in the molecule which is not encapsulated in a microcapsule,
   (d) a crosslinking initiator having a one-minute half-life temperature (Td) of 100° C. or more and less than 160° C., and
   (e) a metal compound,
wherein a molar ratio (divalent metal ion/component (b1)) of
   all divalent metal ions included in (b) the co-crosslinking agent and (e) the metal compound to
   (b1) the $\alpha,\beta$-unsaturated carboxylic acid having 3 to 8 carbon atoms included in (b) the co-crosslinking agent ranges from 0.72 to 0.81, and the single layered spherical core has a hardness difference (Hs−Ho) between a surface hardness Hs and a center hardness Ho thereof in a range from 10 to 50 in Shore D hardness.

2. The golf ball according to claim 1, wherein (c) the crosslinkable compound having two or more polymerizable unsaturated bonds in the molecule is a crosslinkable compound having two or more (meth)acryloyl groups in the molecule.

3. The golf ball according to claim 2, wherein (c) the crosslinkable compound having two or more polymerizable unsaturated bonds in the molecule is at least one member selected from the group consisting of trimethylolpropane tri(meth)acrylate, ethylene glycol di(meth)acrylate, and 1,6-hexanediol di(meth)acrylate.

4. The golf ball according to claim 1, wherein the core rubber composition contains (c) the crosslinkable compound having two or more polymerizable unsaturated bonds in the molecule in an amount ranging from 2 parts by mass to 39 parts by mass with respect to 100 parts by mass of (a) the base rubber.

5. The golf ball according to claim 1, wherein a self-polymerization temperature (Tc) of (c) the crosslinkable compound by heat ranges from 120° C. to 250° C., wherein the self-polymerization temperature (Tc) of (c) the crosslinkable compound by heat is measured with a differential scanning calorimeter (DSC) under measuring conditions of a temperature rising rate of 10° C./min and a measuring temperature range of from −10° C. to 250° C., and a temperature at a peak top of the obtained DSC curve is adopted as the self-polymerization temperature (Tc) of (c) the crosslinkable compound by heat.

6. The golf ball according to claim 1, wherein the core rubber composition contains (b) the co-crosslinking agent in an amount ranging from 15 parts by mass to 50 parts by mass with respect to 100 parts by mass of (a) the base rubber.

7. The golf ball according to claim 1, wherein in the core rubber composition, a mass ratio (component (b1)/component (c)) of
   (b1) the $\alpha,\beta$-unsaturated carboxylic acid having 3 to 8 carbon atoms included in (b) the co-crosslinking agent to
   (c) the crosslinkable compound having two or more polymerizable unsaturated bonds in the molecule
   ranges from 0.40 to 26.0.

8. The golf ball according to claim 1, wherein in the core rubber composition, a total amount of (b1) the $\alpha,\beta$-unsaturated carboxylic acid having 3 to 8 carbon atoms included in (b) the co-crosslinking agent and (c) the crosslinkable compound having two or more polymerizable unsaturated bonds in the molecule ranges from 15 parts by mass to 60 parts by mass with respect to 100 parts by mass of (a) the base rubber.

9. The golf ball according to claim 1, wherein the core rubber composition contains (d) the crosslinking initiator in an amount ranging from 0.1 part by mass to 5.0 parts by mass with respect to 100 parts by mass of (a) the base rubber.

10. The golf ball according to claim 1, wherein the core rubber composition contains (d) the crosslinking initiator in an amount of 0.1 part by mass or more and less than 1.0 part by mass with respect to 100 parts by mass of (a) the base rubber.

11. The golf ball according to claim 1, wherein a temperature difference (Td−Tc) between a self-polymerization temperature (Tc) of (c) the crosslinkable compound by heat and a one-minute half-life temperature (Td) of (d) the crosslinking initiator in the core rubber composition is 30° C. or less, and wherein the self-polymerization temperature (Tc) of (c) the crosslinkable compound by heat is measured with a differential scanning calorimeter (DSC) under measuring conditions of a temperature rising rate of 10° C./min and a measuring temperature range of from −10° C. to 250° C., and a temperature at a peak top of the obtained DSC curve is adopted as the self-polymerization temperature (Tc) of (c) the crosslinkable compound by heat.

12. The golf ball according to claim 1, wherein the core rubber composition contains (e) the metal compound in an amount ranging from 1 part by mass to 40 parts by mass with respect to 100 parts by mass of (a) the base rubber.

13. The golf ball according to claim 1, wherein in the core rubber composition, a total amount of the divalent metal ion included in (b) the co-crosslinking agent and (e) the metal compound ranges from 0.15 mol to 2.2 mol with respect to 100 parts by mass of (a) the base rubber.

14. The golf ball according to claim 1, wherein the center hardness Ho of the spherical core ranges from 40 to 65 in Shore D hardness, and the surface hardness Hs of the spherical core ranges from 70 to 90 in Shore D hardness.

15. The golf ball according to claim 1, wherein
a temperature difference (Td−Tc) between a self-polymerization temperature (Tc) of (c) the crosslinkable compound by heat and a one-minute half-life temperature (Td) of (d) the crosslinking initiator in the core rubber composition is 30° C. or less,
the self-polymerization temperature (Tc) of (c) the crosslinkable compound by heat is measured with a differential scanning calorimeter (DSC) under measuring conditions of a temperature rising rate of 10° C./min and a measuring temperature range of from −10° C. to 250° C., and a temperature at a peak top of the obtained DSC curve is adopted as the self-polymerization temperature (Tc) of (c) the crosslinkable compound by heat, and
the core rubber composition contains (c) the crosslinkable compound having two or more polymerizable unsaturated bonds in the molecule in an amount ranging from 2 parts by mass to 39 parts by mass with respect to 100 parts by mass of (a) the base rubber.

16. The golf ball according to claim 1, wherein
a temperature difference (Td−Tc) between a self-polymerization temperature (Tc) of (c) the crosslinkable compound by heat and a one-minute half-life temperature (Td) of (d) the crosslinking initiator in the core rubber composition is 30° C. or less,
the self-polymerization temperature (Tc) of (c) the crosslinkable compound by heat is measured with a differential scanning calorimeter (DSC) under measuring conditions of a temperature rising rate of 10° C./min and a measuring temperature range of from −10° C. to 250° C., and a temperature at a peak top of the obtained DSC curve is adopted as the self-polymerization temperature (Tc) of (c) the crosslinkable compound by heat,
the core rubber composition contains (c) the crosslinkable compound having two or more polymerizable unsaturated bonds in the molecule in an amount ranging from 2 parts by mass to 39 parts by mass with respect to 100 parts by mass of (a) the base rubber, and
in the core rubber composition, a mass ratio (component (b1)/component (c)) of
(b1) the α,β-unsaturated carboxylic acid having 3 to 8 carbon atoms included in (b) the co-crosslinking agent to
(c) the crosslinkable compound having two or more polymerizable unsaturated bonds in the molecule ranges from 0.40 to 26.0.

17. The golf ball according to claim 1, wherein
a temperature difference (Td−Tc) between a self-polymerization temperature (Tc) of (c) the crosslinkable compound by heat and a one-minute half-life temperature (Td) of (d) the crosslinking initiator in the core rubber composition is 30° C. or less,
the self-polymerization temperature (Tc) of (c) the crosslinkable compound by heat is measured with a differential scanning calorimeter (DSC) under measuring conditions of a temperature rising rate of 10° C./min and a measuring temperature range of from −10° C. to 250° C., and a temperature at a peak top of the obtained DSC curve is adopted as the self-polymerization temperature (Tc) of (c) the crosslinkable compound by heat,
the core rubber composition contains (c) the crosslinkable compound having two or more polymerizable unsaturated bonds in the molecule in an amount ranging from 2 parts by mass to 39 parts by mass with respect to 100 parts by mass of (a) the base rubber,
in the core rubber composition, a mass ratio (component (b1)/component (c)) of (b1) the α,β-unsaturated carboxylic acid having 3 to 8 carbon atoms included in (b) the co-crosslinking agent to
(c) the crosslinkable compound having two or more polymerizable unsaturated bonds in the molecule ranges from 0.40 to 26.0, and
in the core rubber composition, a total amount of the divalent metal ion included in (b) the co-crosslinking agent and (e) the metal compound ranges from 0.15 mol to 2.2 mol with respect to 100 parts by mass of (a) the base rubber.

18. A golf ball comprising a spherical core and at least one cover layer covering the spherical core, wherein
the spherical core is formed from a core rubber composition containing (a) a base rubber, (b) an α,β-unsaturated carboxylic acid having 3 to 8 carbon atoms and/or a metal salt thereof as a co-crosslinking agent, (c) a crosslinkable compound having two or more polymerizable unsaturated bonds in the molecule, (d) a crosslinking initiator, (e) a metal compound, and (f) an organic sulfur compound,
(c) the crosslinkable compound having two or more polymerizable unsaturated bonds in the molecule is a crosslinkable compound having two or more (meth)acryloyl groups in the molecule, and is not encapsulated in a microcapsule, and
a molar ratio (divalent metal ion/component (b1)) of
all divalent metal ions included in (b) the co-crosslinking agent and (e) the metal compound to
(b1) the α,β-unsaturated carboxylic acid having 3 to 8 carbon atoms included in (b) the co-crosslinking agent
ranges from 0.73 to 0.80.

19. The golf ball according to claim 18, wherein (f) the organic sulfur compound is at least one member selected from the group consisting of thiophenols substituted with a halogen, a metal salt of thiophenols substituted with a halogen and diphenyl disulfides substituted with a halogen, and a mass ratio (component (c)/component (f)) of the component (c) to the component (f) ranges from 4 to 30.

20. A golf ball comprising a spherical core and at least one cover layer covering the spherical core, wherein the spherical core is formed from a core rubber composition containing (a) a base rubber,
(b) an α,β-unsaturated carboxylic acid having 3 to 8 carbon atoms and/or a metal salt thereof as a co-crosslinking agent,
(c) a crosslinkable compound having two or more polymerizable unsaturated bonds in the molecule which is not encapsulated in a microcapsule,
(d) a crosslinking initiator, and
(e) a metal compound,
wherein a molar ratio (divalent metal ion/component (b1)) of
all divalent metal ions included in (b) the co-crosslinking agent and (e) the metal compound to
(b1) the α,β-unsaturated carboxylic acid having 3 to 8 carbon atoms included in (b) the co-crosslinking agent
ranges from 0.60 to 0.81,
a mass ratio (component (b1)/component (c)) of
(b1) the α,β-unsaturated carboxylic acid having 3 to 8 carbon atoms included in (b) the co-crosslinking agent to
(c) the crosslinkable compound having two or more polymerizable unsaturated bonds in the molecule
ranges from 0.40 to 4.1, and
the spherical core has a hardness difference (Hs−Ho) of 18 or more in Shore D hardness between a surface hardness Hs and a center hardness Ho thereof.

21. A golf ball comprising a spherical core and at least one cover layer covering the spherical core, wherein the spherical core is formed from a core rubber composition containing (a) a base rubber,
(b) an α,β-unsaturated carboxylic acid having 3 to 8 carbon atoms and/or a metal salt thereof as a co-crosslinking agent,
(c) a crosslinkable compound having two or more polymerizable unsaturated bonds in the molecule which is not encapsulated in a microcapsule,
(d) a crosslinking initiator, and
(e) a metal compound,
wherein a molar ratio (divalent metal ion/component (b1)) of
all divalent metal ions included in (b) the co-crosslinking agent and (e) the metal compound to
(b1) the α,β-unsaturated carboxylic acid having 3 to 8 carbon atoms included in (b) the co-crosslinking agent
ranges from 0.60 to 0.81,
a mass ratio (component (b1)/component (c)) of
(b1) the α,β-unsaturated carboxylic acid having 3 to 8 carbon atoms included in (b) the co-crosslinking agent to
(c) the crosslinkable compound having two or more polymerizable unsaturated bonds in the molecule
ranges from 0.40 to 4.1, and
the spherical core has a surface hardness Hs of 75 or more in Shore D hardness.

22. The golf ball according to claim 20, wherein (d) the crosslinking initiator has a one-minute half-life temperature (Td) of 100° C. or more and less than 160° C.

23. The golf ball according to claim 21, wherein (d) the crosslinking initiator has a one-minute half-life temperature (Td) of 100° C. or more and less than 160° C.

* * * * *